United States Patent
Gren et al.

(10) Patent No.: US 11,915,399 B2
(45) Date of Patent: Feb. 27, 2024

(54) METHOD AND DEVICE FOR CORRECTING LATERAL CHROMATIC ABERRATION, STORAGE MEDIUM, AND COMPUTER EQUIPMENT

(71) Applicant: Changzhou Raytech Optronics Co., Ltd., Changzhou (CN)

(72) Inventors: Juuso Gren, Tampere (FI); Dmytro Paliy, Tampere (FI); Vida Fakour Sevom, Tampere (FI)

(73) Assignee: Changzhou Raytech Optronics Co., Ltd., Changzhou (CN)

( * ) Notice: Subject to any disclaimer, the term of this patent is extended or adjusted under 35 U.S.C. 154(b) by 664 days.

(21) Appl. No.: 17/138,943

(22) Filed: Dec. 31, 2020

(65) Prior Publication Data

US 2022/0207666 A1 Jun. 30, 2022

(51) Int. Cl.
*G06K 9/00* (2022.01)
*G06T 5/00* (2006.01)
*G02B 27/00* (2006.01)

(52) U.S. Cl.
CPC .......... *G06T 5/006* (2013.01); *G02B 27/0025* (2013.01)

(58) Field of Classification Search
CPC ........................... G06T 5/006; G02B 27/0025
See application file for complete search history.

(56) References Cited

U.S. PATENT DOCUMENTS

| | | | | |
|---|---|---|---|---|
| 2002/0070944 A1* | 6/2002 | Deering | ............... | H04N 9/3185 345/581 |
| 2003/0206179 A1* | 11/2003 | Deering | ............... | H04N 9/3147 345/589 |
| 2008/0291447 A1* | 11/2008 | Vakrat | .................. | H04N 25/134 356/364 |
| 2016/0314564 A1* | 10/2016 | Jones | ...................... | G06T 5/006 |

FOREIGN PATENT DOCUMENTS

WO WO-2009141403 A1 * 11/2009 ............. G06T 5/006

* cited by examiner

*Primary Examiner* — Avinash Yentrapati
(74) *Attorney, Agent, or Firm* — W&G Law Group

(57) ABSTRACT

Provided is a method and a device for correcting lateral chromatic aberration, a storage medium and a computer equipment. The method includes acquiring system parameters and pre-stored calibration data, obtaining the lateral chromatic aberration of a camera to be corrected by calculating the system parameters, and correcting the LCA by the calibration data. The lateral chromatic aberration of the camera lens may be corrected in terms of hardware and costs are saved.

4 Claims, 12 Drawing Sheets

METHOD AND DEVICE FOR CORRECTING LATERAL CHROMATIC ABERRATION, STORAGE MEDIUM, AND COMPUTER EQUIPMENT

TECHNICAL FIELD

The present invention relates to the field of digital image processing, and in particular, to a method and a device for correcting lateral chromatic aberration, a storage medium, and a computer equipment.

BACKGROUND

In an ideal lens, all wavelengths have the same single focal point, but such an ideal lens does not exist in practice. A refractive index of any medium except for the vacuum varies with the wavelength. When visible light passes through a camera lens, light having a greater wavelength has a smaller refractive index. For most lenses, blue light has a greatest refractive index, followed by green light and red light. Light at different wavelengths focuses at different positions, resulting in displacement of focal points of the blue, green and red lights, which may be categorized into two types, i.e., displacement in a direction parallel to a focal plane and displacement in a direction perpendicular to the focal plane. Chromatic aberration caused by the displacement in the direction parallel to the focal plane is referred to as lateral chromatic aberration (LCA), which is the most common and visually obvious, and the influence caused by the lateral chromatic aberration is growing with the continuous increase of resolution of an image sensor and the continuous reduction of pixel size, and thus becomes a problem to be solved in, for example, a motion camera, a CCTV camera and a camera of an automobile data recorder.

At present, it is very difficult and expensive to correct the LCA of the camera lens in terms of hardware.

SUMMARY

In view of the above, the embodiments of the present invention provide a method and a device for correcting LCA, a storage medium, and a computer equipment. By the present invention, the LCA of the camera lens can be corrected in terms of hardware with saved costs.

In a first aspect, an embodiment of the present invention provides a method for correcting LCA, comprising: acquiring a system parameters and pre-stored calibration data; obtaining the LCA of a camera to be corrected by calculating the system parameters; and correcting the LCA by the calibration data.

As an improvement, the method further comprises prior to acquiring the first target image and the pre-stored calibration data: capturing a target image from a test chart; calculating amount of LCA of a camera module based on the target image; and storing the amount of LCA as the calibration data As an improvement, the step of storing the amount of LCA as the calibration data specifically comprises storing the amount of LCA as the calibration data into a memory of the camera to be corrected.

As an improvement, the calibration data comprises data in the format of a grid, a parametric model, or a symmetric model.

As an improvement, the step of calculating the amount of LCA of the camera module based on the target image comprises: upscaling the target image to obtain an upscaled target image; detecting pattern elements and calculating mass centers of the pattern elements based on the upscaled target image; compensating for shift of the mass centers by Bayer shift compensation; removing the pattern elements with wrong parameters by an outlier removal algorithm; extrapolating the mass centers of the pattern elements at borders of the upscaled target image; and converting scattered data into 2D regularly sampled grid to obtaining the amount of LCA.

In a second aspect, an embodiment of the present invention provides a device for correcting LCA, comprising an acquisition module configured to acquire system parameters and pre-stored calibration data; a first calculation module configured to obtain the LCA of a camera to be corrected; and a correction module configured to correct the LCA by the calibration data.

As an improvement, the device for correcting LCA further comprises: a capturing module configured to capture a target image from a test chart; a second calculation module configured to calculate amount of LCA of a camera module based on the target image; and a storage module configured to store the amount of LCA as the calibration data.

As an improvement, the storage module is further configured to store the amount of LCA to a memory of the camera to be corrected.

As an improvement, the calibration data comprises data in the format of a grid, a parametric model, or a symmetric model.

As an improvement, the second calculation module comprises: a upscaling sub-module configured to upscale the target image to obtain an upscaled target image; a calculation sub-module configured to detect pattern elements and calculating mass centers of the pattern elements based on the upscaled target image; a compensation sub-module configured to compensate for shift of the mass centers by Bayer shift compensation; a removal sub-module configured to remove the pattern elements with wrong parameters by an outlier removal algorithm; an extrapolation sub-module configured to extrapolate the mass centers of the pattern elements at borders of the upscaled target image; and a conversion sub-module configured to convert scattered data into 2D regularly sampled grid to obtain the amount of LCA.

In a third aspect, an embodiment of the present invention provides a computer-readable storage medium, which stores a computer program comprising program instructions, which, when executed in a computer, cause the computer to execute the above method for correcting the LCA.

In a fourth aspect, an embodiment of the present invention provides a computer equipment, comprising a memory configured to store information including program instructions and a processor configured to control execution of the program instructions, wherein the program instructions, when loaded and executed by the processor, perform the steps of the above method for correcting the LCA.

In the technical solutions of the method and the device for correcting the LCA, the storage medium, and the computer equipment provided by the embodiments of the present invention, system parameters and pre-stored calibration data are acquired; the LCA of a camera to be corrected is obtained by calculating the system parameters; and the LCA is corrected by the calibration data. In embodiments in the present invention, the LCA of the camera lens is corrected in terms of hardware with saved costs.

BRIEF DESCRIPTION OF DRAWINGS

The following drawings will be described to clearly illustrate the technical solutions of the embodiments according to the present invention. It is appreciated that, the drawings as described below merely illustrate some examples of the present invention, and those skilled in the art may realize other embodiments based on these examples without making creative efforts.

DESCRIPTION OF EMBODIMENTS

The embodiments of the present invention will be described in detail below with reference to the accompanying drawings to better understand the technical solutions of the present invention.

It should be clear that the described embodiments merely are part of the embodiments according to the present invention, rather than all embodiments. All the other embodiments that may be obtained by those skilled in the art based on these embodiments described in the present invention without creative efforts fall within the scope of the present invention.

The terms used in the embodiments of the present invention are only for the purpose of describing the specific embodiments, but are not intended to limit the present invention. The singular form of "a/an", "said" and "the" used in the embodiments of the present invention and the appended claims are also intended to include plural forms, unless the context clearly indicates other meanings.

It should be understood that the term of "and/or" used herein merely indicates the association relationships of the associated objects as described, including three possible relationships, for example, A and/or B, which means three cases of only A, both A and B, and only B. In addition, the character of "/" used herein generally indicates that the associated objects are in a relationship of "or".

Figure 1:
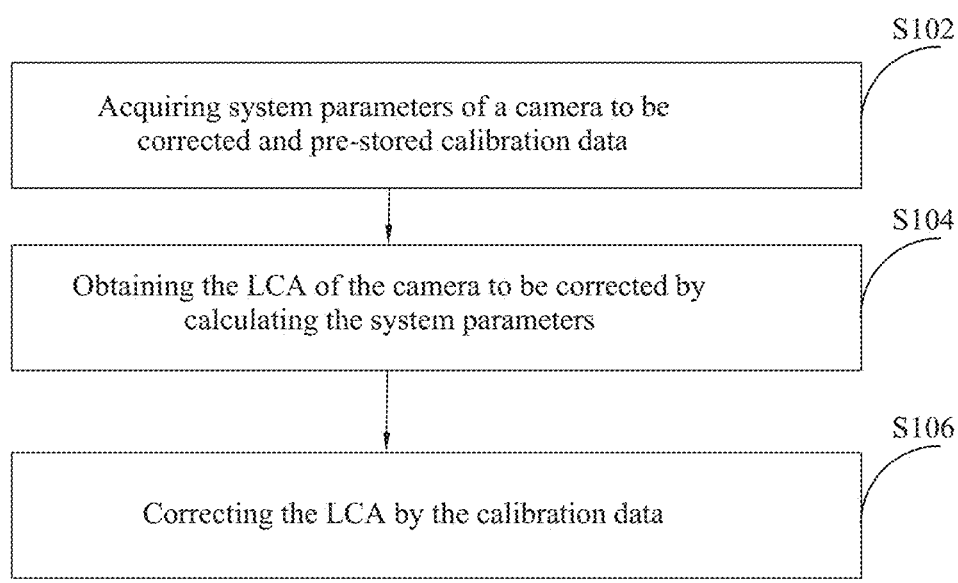
FIG. 1 is a flow chart of a method for correcting LCA according to an embodiment of the present invention.

FIG. 1 is a flow chart of a method for correcting the LCA according to an embodiment of the present invention. As shown in FIG. 1, the method includes the following steps:

S102: acquiring system parameters of a camera to be corrected and pre-stored calibration data;

S104: obtaining the LCA of the camera to be corrected by calculating the system parameters; and S106: correcting the LCA by the calibration data.

In the technical solution of the method for correcting the LCA according to the present invention, the system parameters of a camera to be corrected and the pre-stored calibration data are acquired; the LCA of the camera to be corrected is obtained by calculating the system parameters; and the LCA is corrected by the calibration data. The LCA may be corrected in terms of hardware with saved costs.

Figure 2:
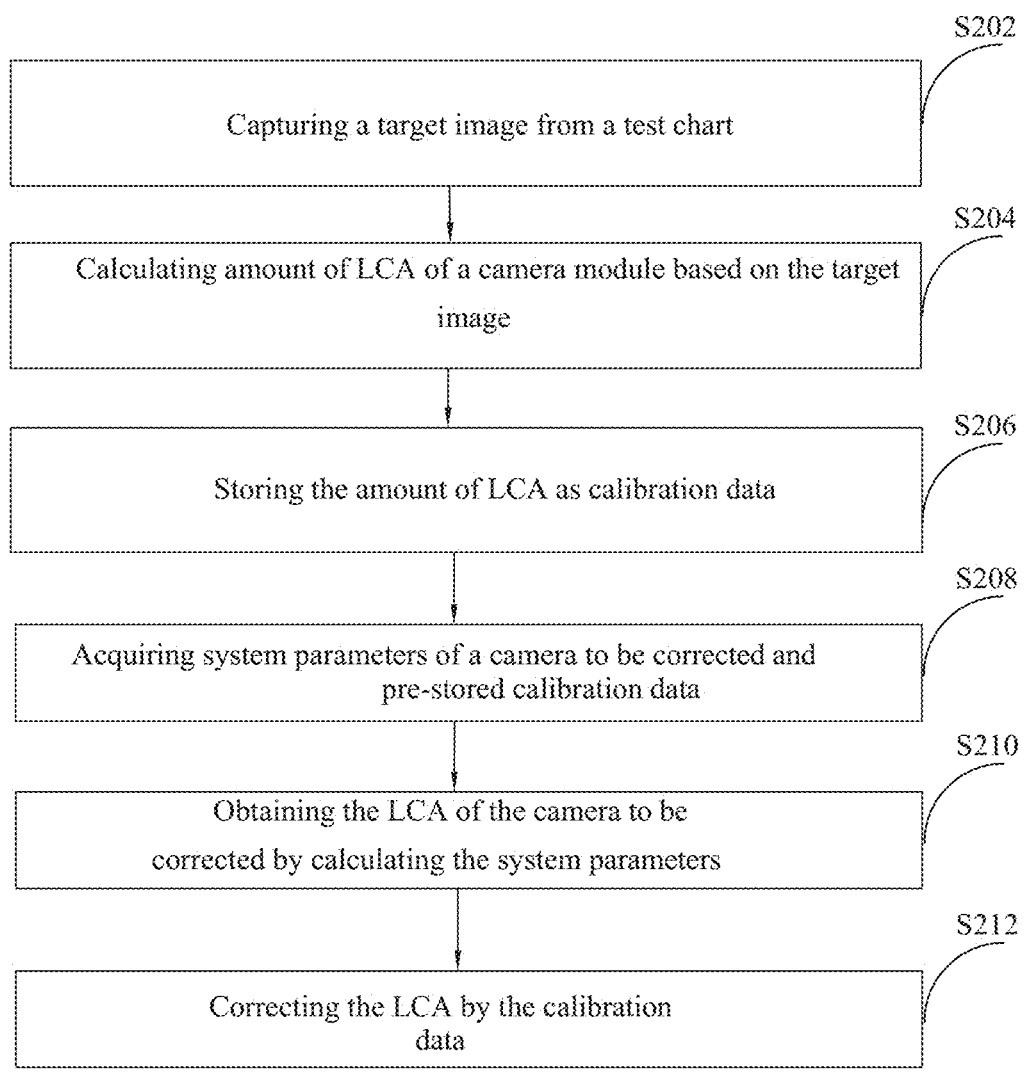
FIG. 2 is a flow chart of a method for correcting LCA according to another embodiment of the present invention.

FIG. 2 is a flow chart of a method for correcting LCA according to another embodiment of the present invention. As shown in FIG. 2, the method comprises the following step:

S202: capturing a target image from a test chart.

In an embodiment of the present invention, each step may be performed by the device for correcting the LCA.

Figure 4:
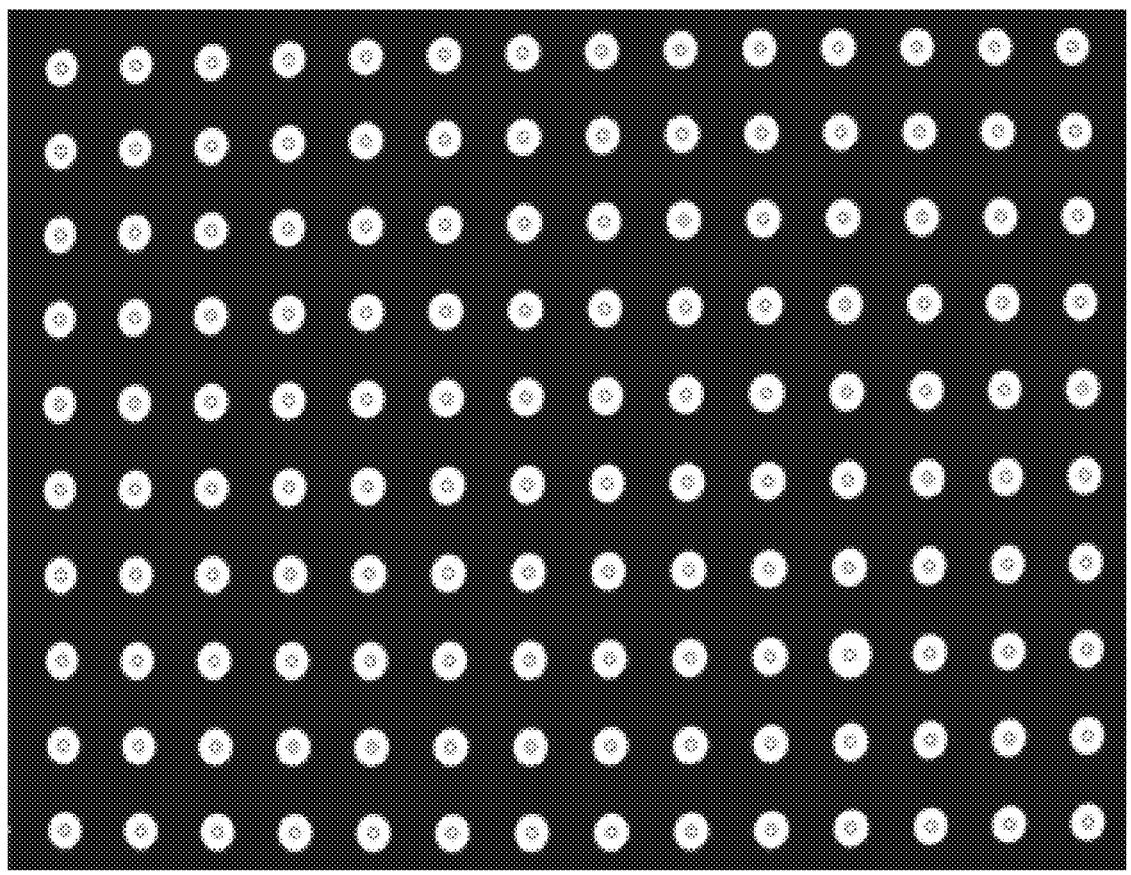
FIG. 4 is a test chart according to an embodiment of the present invention.
Figure 5:
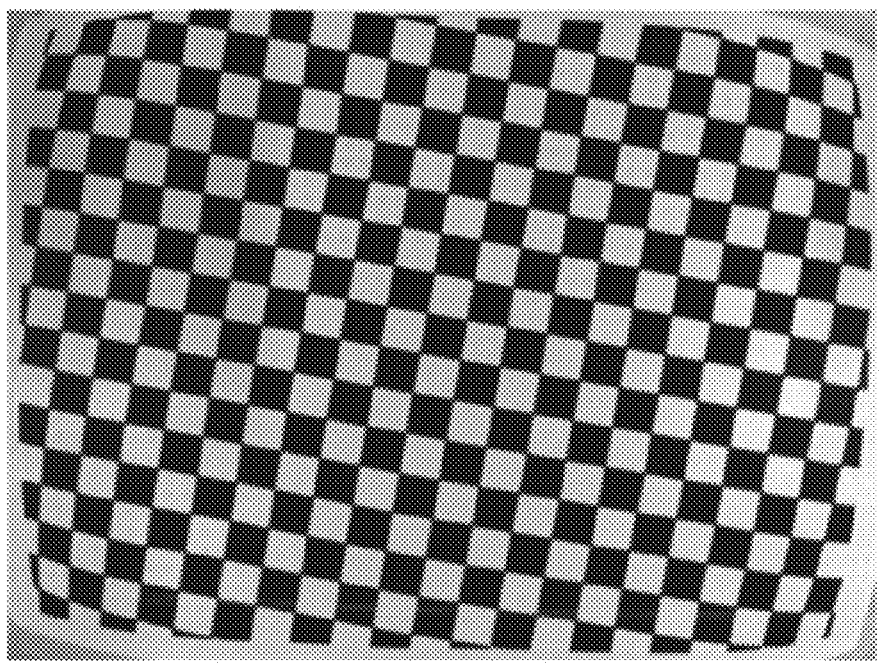
FIG. 5 is another test chart according to an embodiment of the present invention.

In S202, the test chart may include a chart with dots (as shown in FIG. 4), a chart with crosses, a chart with corners of squares (as shown in FIG. 5), etc. The present invention does not limit the form of the test chart. The dots, crosses, or corners of squares are pattern elements constituting the respective test chart. The purpose of using the test chart in an embodiment of the present invention is to define visible positions of each color component of the same structure on an imaging sensor.

The method further includes the following step:

S204: calculating amount of LCA of a camera module based on the target image.

Figure 3:
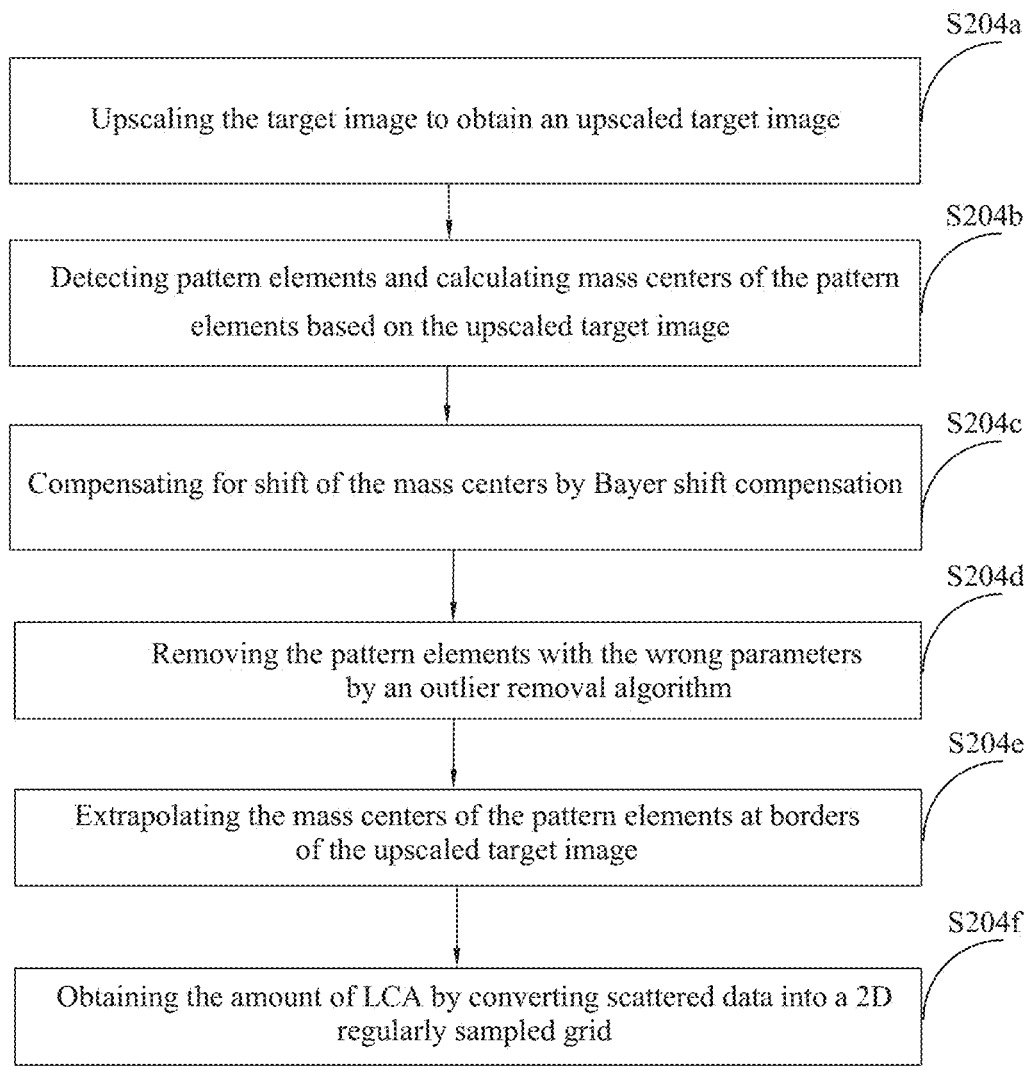
FIG. 3 is a flow chart of calculating amount of LCA according to an embodiment of the present invention.

In an embodiment of the present invention, with reference to FIG. 3, S204 specifically includes steps of S204a, S204b, S204c, S204d, S204e, and S204f that will be described below.

S204a: upscaling the target image to obtain an upscaled target image.

In S204a, the target image is upscaled to improve accuracy and robustness for calculating mass centers of pattern elements.

As aforementioned, the pattern elements in the test image may be dots, crosses, or corners of squares, but are not limited to these forms.

In an embodiment of the present invention, some pre-processing steps, namely defect pixel correction, noise filtering, and lens shading correction are needed to be done prior to the step of S204.

S204b: detecting pattern elements and calculating mass centers of the pattern elements based on the upscaled target image.

Before the step 204b, an embodiment of the present invention first converts a grayscale image into a binary image in order to separate background from the pattern elements.

Specifically, the mass centers of the pattern elements such as dots may be found by means of existing Matlab command "regionprops". The mass centers of the pattern elements may be directly calculated by definitions thereof, which is already implemented within the Matlab toolbox.

The method for correcting the LCA according to an embodiment of the present invention works with any sizes of the pattern elements in the test chart. After the target image is captured, locations of pattern elements or other details in the target image are automatically detected. The mass centers are points associated with the detected pattern elements, and are calculated in each color channel with sub-pixel accuracy. The detection process of the pattern elements is performed in data collected by a raw Bayer pattern imaging sensor. It is worth to emphasize that the method for correcting LCA according to an embodiment of the present invention may be applied to both single-color value per location Bayer-sampled data or restored three-color value RGB data per location.

S204c: compensating for shift of the mass centers by Bayer shift compensation.

In an embodiment of the present invention, the shift of mass centers of the pattern elements is compensated by Bayer shift compensation, and color-filtered pixels are located.

It should be noted that, since the target image is collected by the Bayer imaging sensor, shifts between color channels must be considered. Therefore, the calculated mass centers in each individual color channel are compensated based on the shifts between the color channels.

S204d: removing the pattern elements with wrong parameters by an outlier removal algorithm.

In an embodiment of the present invention, outliers are detected by checking shape parameters of the pattern elements. If the detected pattern elements have wrong parameters, the pattern elements with the wrong parameters are deleted.

S204e: extrapolating the mass centers of the pattern elements at borders of the upscaled target image.

In an embodiment of the present invention, on the one hand, there is no typical measurement data at borders and corners of the upscaled target image; on the other hand, LCA phenomenon is usually most severe near the borders of the image. An embodiment of the present invention proposes to build parametric approximation model by exploiting measured data and extrapolate distortion at borders and corners of the image. This allows for creating regularly sampled 2D array of distortion for the whole image more accurately.

S204f: obtaining the amount of LCA by converting scattered data into a 2D regularly sampled grid.

In an embodiment of the present invention, the locations of detected pattern elements are represented as regularly sampled 2D array data by interpolating given random globally located pattern elements in an input image.

S206: storing the amount of LCA as calibration data.

In the present invention, the step of S206 specifically includes storing the amount of LCA as the calibration data into a memory of the camera to be corrected.

In S206, the data as 2D arrays of vectors can be filtered with conventional convolution filters and written to the memory of the camera to be corrected efficiently. It is enough to store vectors only without needing to store coordinates of points for which these vectors are calculated.

The method for correcting LCA in the related art is convert the detected pattern elements in Cartesian coordinates to polar coordinate system whose center is the optical center of lens, where LCA is the difference of red and green radius and blue and green radius. Having LCA in different radius makes it possible to generate a parametric model (e.g. n-degree polynomial). Therefore, the parametric model of this method requires quite low amount of memory. However, this method heavily relies on radially symmetric LCA, which is corrected only during optics design, and hardly achievable in mass-produced lenses manufacturing, due to non-idealities in lens barrel alignment and materials.

Figure 6:
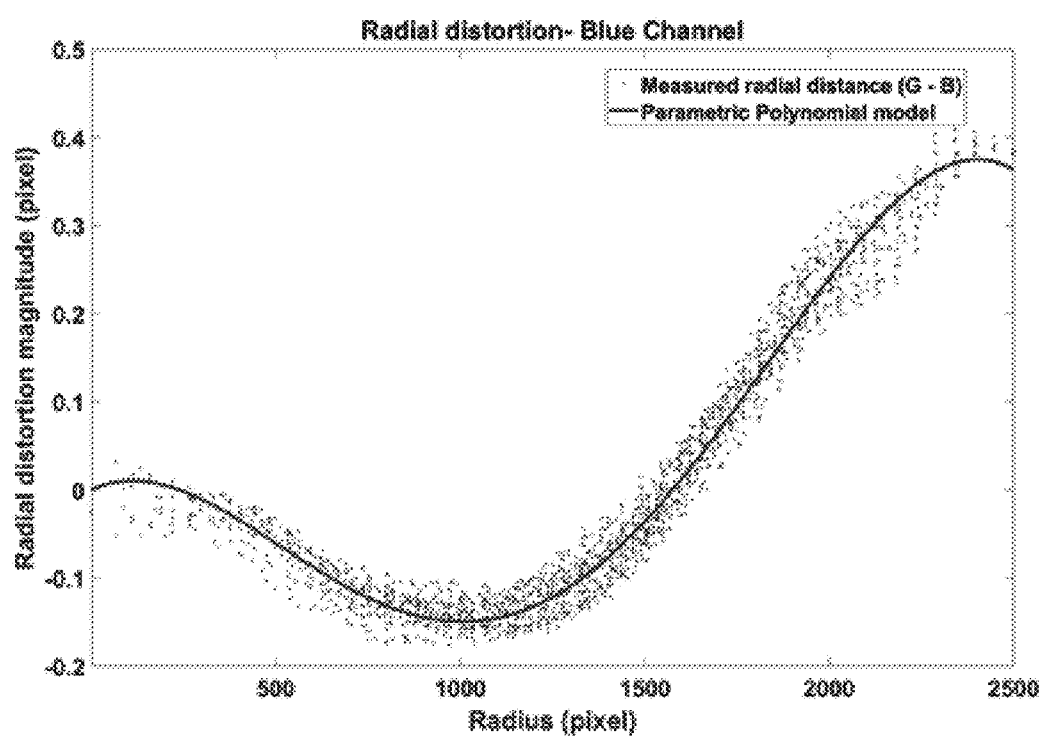
FIG. 6 is a measurement diagram of radial LCA in a blue channel according to an embodiment of the present invention.
Figure 7:
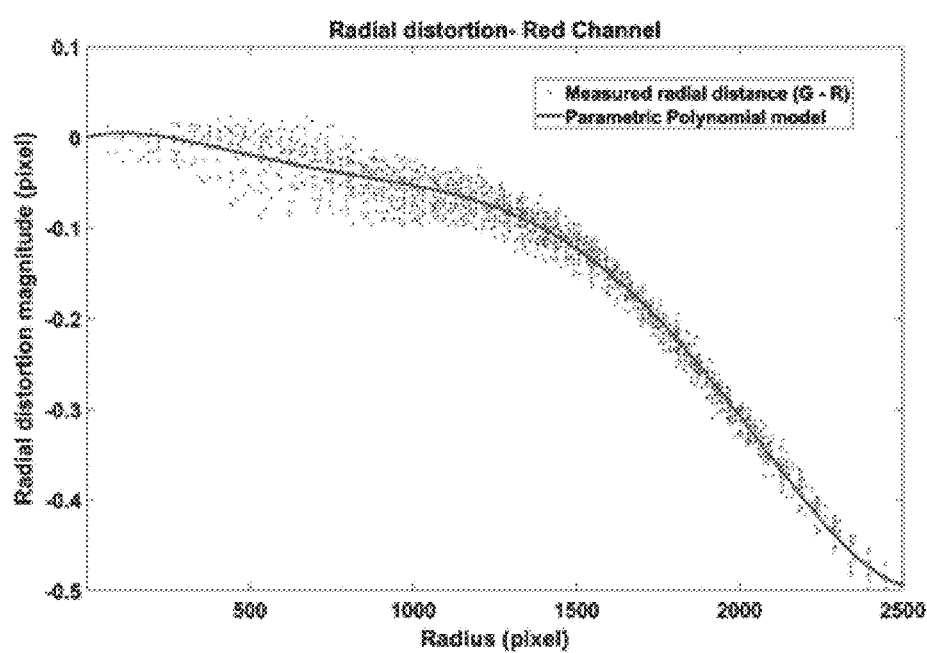
FIG. 7 is a measurement diagram of radial LCA in a red channel according to an embodiment of the present invention.
Figure 8:
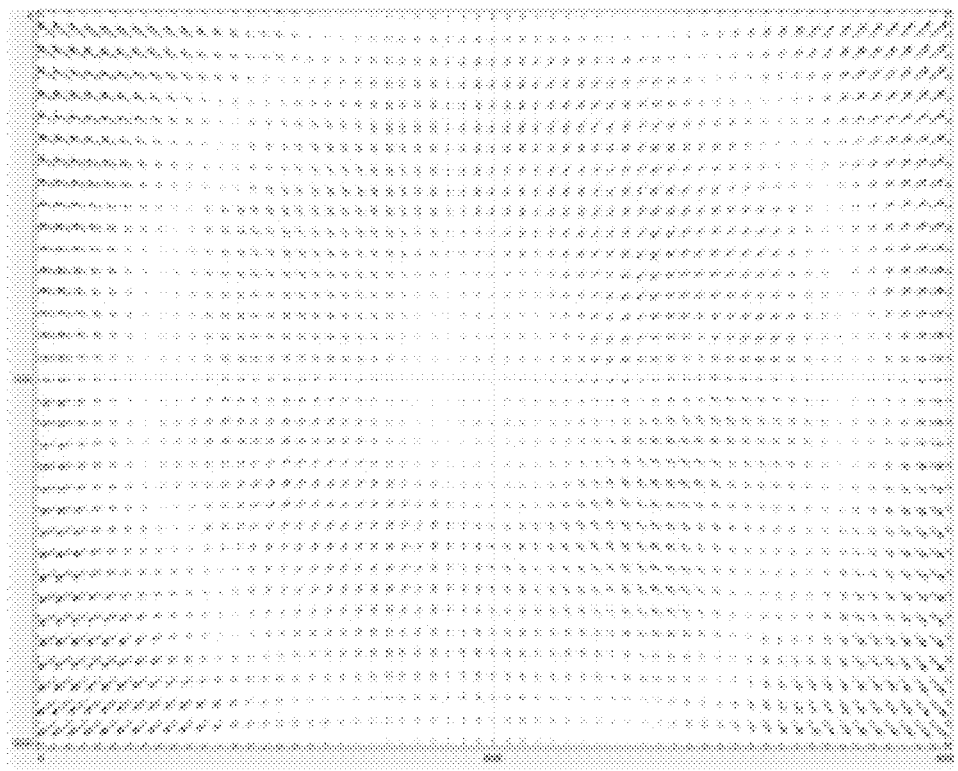
FIG. 8 is a measurement diagram of non-parametric LCA 2D grid of vectors in a blue channel according to an embodiment of the present invention.
Figure 9:
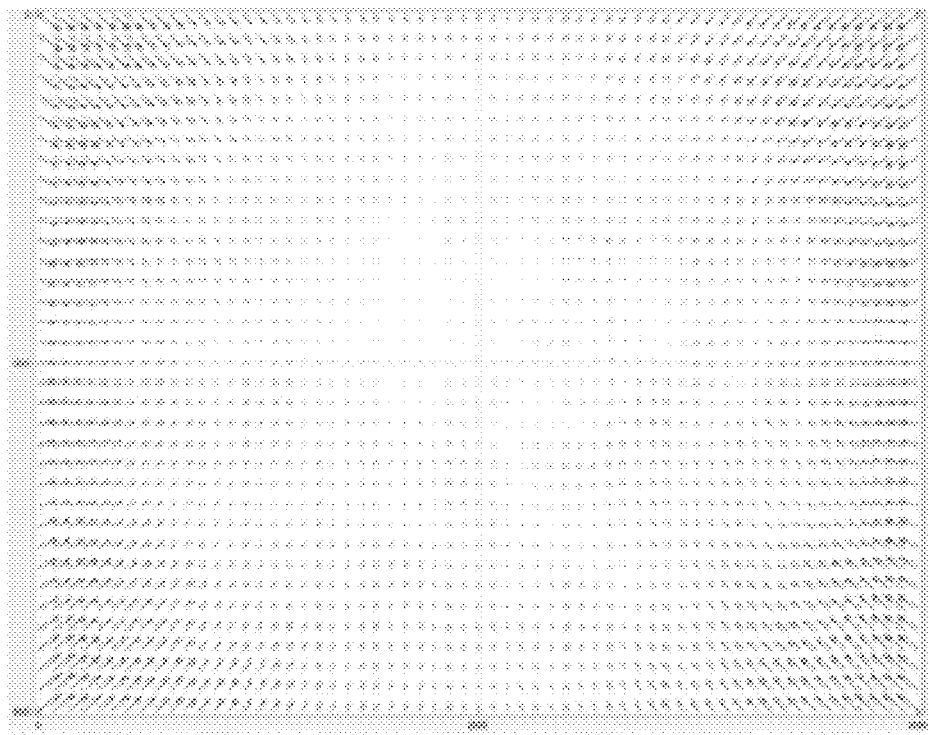
FIG. 9 is a measurement diagram of non-parametric LCA 2D grid of vectors in a red channel according to an embodiment of the present invention.

One of benefits of the method according to the present invention is possibility to compensate misalignment of lenses within the assembled lens barrel. Moreover, degree of polynomial function might vary a lot module to module. As seen in FIGS. 6 and 7, for a fixed field (radius), LCA values vary not only in vector's magnitude in radial direction towards optical (sensor) center, but also in spatial direction. This shows the fact that LCA is not completely radially symmetric in the optics, which ideal assembly process should be a single line, as shown in FIGS. 6 and 7. Therefore, in an embodiment according to the present invention, spatial 2D LCA is measured and used for correction. FIGS. 8 and 9 illustrate magnified aberrations in terms of direction and distance and how blue and red colors are distorted against green color component.

In view of above, an embodiment of the present invention proposes to a calibration method for non-symmetric non-parametric LCA. Assumption of LCA being radially symmetric is valid only in optics design and modeling, while in mass production, such model is only approximation due to errors in lens barrel assembly and materials. If manufacturing process is ideal, then all measured data (scatter) in FIG. 6 would be lying on respective lines, and the lines would be identical to the modeled optical distortion, provided measurement errors are zero. Thus, in this embodiment of the present invention, errors and deficiencies in assembly and materials may be compensated.

In the present invention, it is not necessary to add any hardware structure to the camera to be calibrated, and only the original storage inside the camera to be calibrated is used.

In the present invention, the calibration data includes data in the format of a grid, a parametric model, or a symmetric model. Therefore, the method for correcting the LCA according to the present invention supports calibration data in different formats, thereby improving the flexibility. The calibration data in the grid format is the most accurate, but occupies the most memory. If memory consumption have to be decreased, the memory may be compressed by changing format, size of the grid/model, data precision of the calibration data, etc.

In the present invention, the LCA of the camera lens to be calibrated may be calibrated in advance to obtain the calibration data, and the calibration data may then be stored into the storage of the camera to be corrected. This method is fast and simple for mass production line, thus every camera to be calibrated may be calibrated individually.

The method further includes the following steps:

S208: acquiring system parameters of a camera to be corrected and pre-stored calibration data.

S210: obtaining the LCA of the camera to be corrected by calculating the system parameters.

S212: correcting the LCA by the calibration data.

In the present invention, the LCA calibration is a procedure to measure spatial distance between point in red and blue against green spectral representation in imaging sensor of the same real-world point. Such distance in ideal aberration-free optical system shall be zero, while the distance in practice is not zero. The purpose of the correction in the present invention is make this distance become zero.

Figure 10:
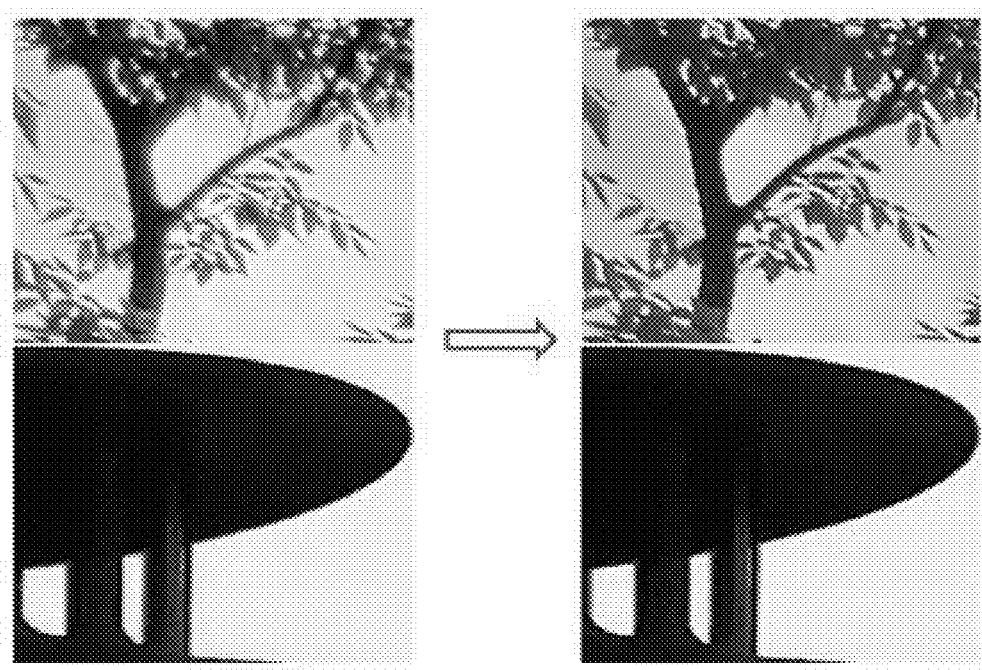
FIG. 10 is a comparison diagram of pictures before correcting LCA and after correcting LCA according to an embodiment of the present invention.

As an alternative, the calibration data is used to correct the LCA by an interpolation algorithm. Specifically, the calibration data in 2D calibrated grid is interpolated to sensor size and applied to the whole image. The Interpolation algorithm include linear interpolation, nearest neighbor interpolation, and bicubic interpolation. In the present invention, the better the interpolation algorithm for the given problem domain, the better the quality of the target image obtained after the LCA is corrected may be achieved. Even simple bicubic interpolation gives visually pleasant results, as shown in FIG. 10.

For example, if the R channel in the target image is moved to the left by 0.4 pixels relative to the G channel, the R channel in the target image is moved to the right by 0.4 pixels by the interpolation algorithm.

In an embodiment of the present invention, only red and blue pixels values are altered, which means only half of sensor data is changed. As compared with doing the same restoration in RGB domain, the embodiment of the present invention has a significantly improved computing efficiency and a significantly better image recovery quality.

In the present invention, considering that the LCA of the camera lens to be calibrated is not always constant in various circumstances, changes in positions and temperature of the lens will adversely affect the LCA. The present solution may be adapted to the LCA correction of the camera in different environments by making and storing the calibration data of the lens of the camera to be calibrated in different environments.

It should be noted that, in practice, in addition to correcting the LCA, the image is usually processed by demosaicing and denoising, so that the quality of the image may be ensured. If denoising is sensitive to noise model, correcting the LCA for the image before denoising may cause the reduction of the resolution and sharpness of a single color channel, and may also cause the reduction of the noise performance of the image. Therefore, correcting the LCA shall be performed after denoising, but before demosaicing.

In the technical solution of a method for correcting LCA according to the present invention, a target image is captured from a test chart; amount of LCA of a camera module is calculated based on the target image; the amount of LCA is stored as calibration data; system parameters of a camera to be corrected and the pre-stored calibration data are obtained; the LCA of the camera to be corrected is obtained by calculating the system parameters; the LCA is corrected by the calibration data. In the present invention, the LCA of the camera lens may be corrected in terms of hardware with saved costs.

Figure 11:
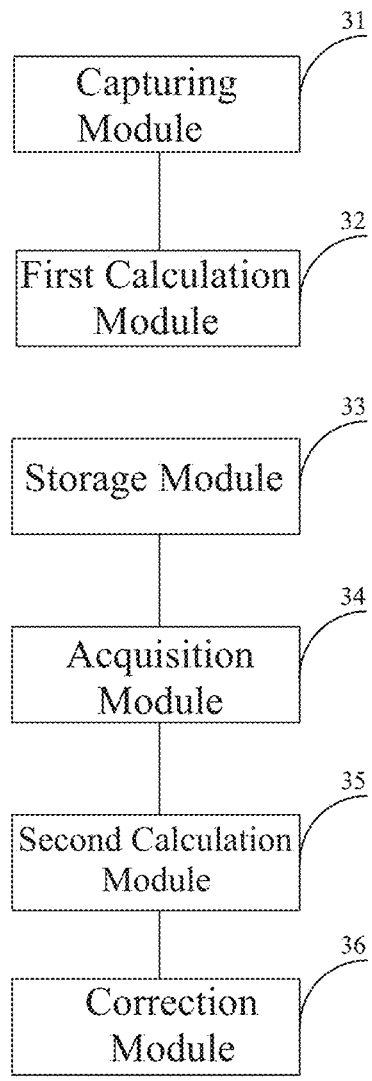
FIG. 11 is a schematic structural diagram of a device for correcting LCA according to an embodiment of the present invention.

FIG. 11 is a schematic structural diagram of a device for correcting LCA correction according to an embodiment of the present invention. As shown in FIG. 11, the device includes a capturing module 31, a first calculation module 32, a storage module 33, an acquisition module 34, a second calculation module 35, and a correction module 36.

The capturing module 31 is configured to capture a target image from a test chart.

For example, as shown in FIG. 4, the test chart may include a chart with dots. The present invention does not limit the form of the test chart, and the test chart may also include a chart of with more crosses, dots, corners of squares in a checkerboard, etc.

The first calculation module 32 is configured to calculate amount of LCA of a camera module to be corrected based on the target image.

In the present invention, the first calculation module 32 specifically includes an upscaling sub-module 32a, a calculation sub-module 32b, a compensation sub-module 32c, a removal sub-module 32d, an extrapolation sub-module 32e, and a conversion sub-module 32f.

The upscaling sub-module 32a is configured to upscale the target image to obtain an upscaled target image.

The calculation sub-module 32b is configured to detect pattern elements and calculate mass centers of the pattern elements based on the upscaled target image.

The compensation sub-module 32c is configured to compensate shift of the mass centers by Bayer shift compensation.

The removal sub-module 32d is configured to remove the pattern elements with wrong parameters by an outlier removal algorithm.

The extrapolation sub-module 32e is configured to extrapolate the mass centers of the pattern elements at borders of the upscaled target image.

The conversion sub-module 32f is configured to obtain the amount of LCA by converting scattered data to a 2D regularly sampled grid.

The storage module 33 is configured to store the amount of LCA as calibration data.

In the present invention, the storage module 33 is specifically configured to store the amount of LCA as calibration data into the storage of the camera to be corrected.

In the present invention, it is not necessary to add any hardware structure to the camera to be calibrated, and only the original storage inside the camera to be calibrated is used.

In the present invention, the calibration data includes data in the format of a grid, a parametric model, or a symmetric model. Therefore, the method for correcting LCA according to the present invention supports calibration data in different formats, achieving increased flexibility. The calibration data in grid form is most accurate, but occupies most memory. If memory consumption have to be decreased, the memory may be compressed by changing format, size of the grid/model, data precision of the calibration data, etc.

In the present invention, the LCA of the camera lens to be calibrated may be calibrated in advance to obtain the calibration data, and the calibration data are stored in the storage of the camera to be correct. This method is fast and simple for mass production line, thus every camera to be calibrated may be calibrated individually.

The acquisition module 34 is configured to acquire system parameters and pre-stored calibration data.

The second calculation module 35 is configured to obtain the LCA of the camera to be corrected by calculating the system parameters.

The correction module 36 is configured to correct the LCA by the calibration data.

In the present invention, the interpolation algorithm includes a bicubic interpolation algorithm.

For example, if the R channel of the target image is moved to the left by 0.4 pixels relative to the G channel, the R channel of the target image will be moved to the right by 0.4 pixels by the interpolation algorithm.

In the present invention, the better the interpolation algorithm, the better the quality of the target image obtained after the LCA correction may be achieved. Optionally, the interpolation algorithm comprises a bicubic interpolation algorithm.

In the present invention, considering that the LCA of the camera lens to be calibrated is not always constant in various circumstances, changes in positions and temperature of the lens may adversely affect the LCA. This solution may be adapted to correct the LCA of the camera lens to be calibrated in different environments by making and storing the calibration data of the camera to be calibrated in different environments.

It should be noted that, in practice, in addition to the LCA correction, the image is usually processed by demosaicing and denoising, so that the quality of the image may be ensured. If denoising is sensitive to noise model, correcting the LCA for the image before denoising may reduce the resolution and sharpness of a single color channel, and will cause the reduction of the noise performance of the image. Therefore, correcting the LCA shall be performed after denoising, and before demosaicing, if the image processing chain is designed such that denoising is done prior to demosaicing. Otherwise, optimal aberration correction is prior to the denoising and demosaicing.

The device for correcting the LCA according to the present invention may be used to implement the method for correcting the LCA as shown in FIGS. 1 and 2, the detailed description can be referred to the embodiments of the method for correcting LCA correction as described above and will not be repeated here.

In a technical solution of a device for LCA correction according to the present invention, a target image is captured from a test chart; amount of LCA of a camera module is calculated based on the target image; the amount of LCA is stored as calibration data; system parameters of a camera to be corrected and pre-stored calibration data are obtained; the LCA of the camera to be corrected is obtained by calculating the system parameters; the LCA is corrected by the calibration data. In the present invention, the LCA of the camera lens may be corrected in terms of hardware, and costs are saved.

Figure 12:
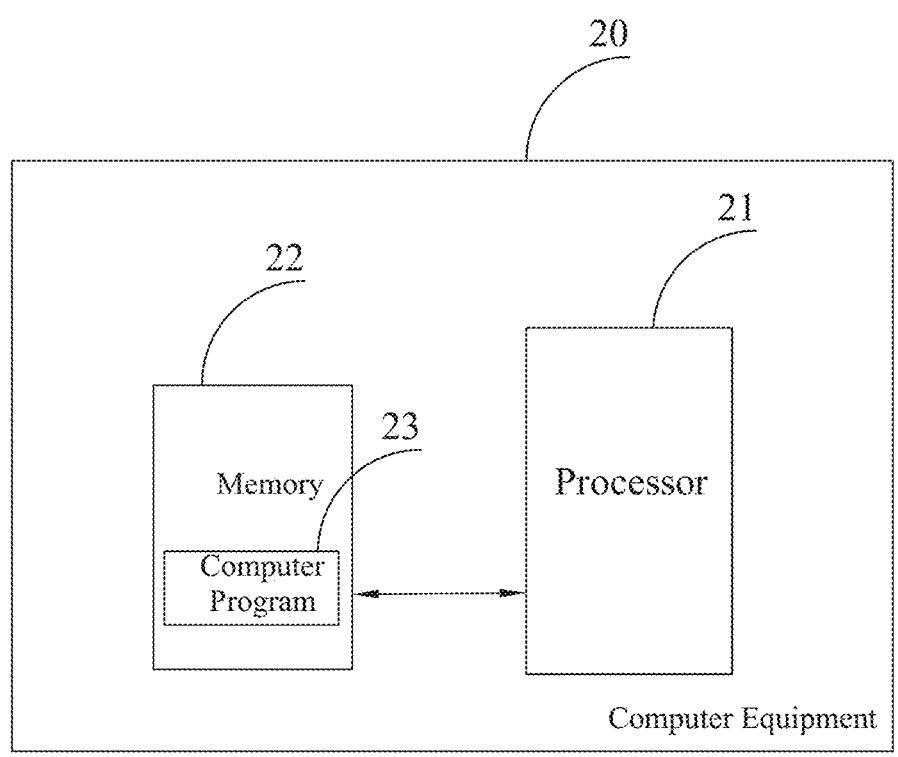
FIG. 12 is a schematic diagram of a computer equipment according to an embodiment of the present invention.

FIG. 12 is a schematic diagram of a computer equipment according to of an embodiment the present invention. As shown in FIG. 12, the computer equipment 20 includes a processor 21, a memory 22, and a computer program 23 stored in the memory 22 and running on the processor 21. When executed by the processor 21, the computer program 23 causes the method LCA for correcting the LCA as described above (which will not be described in detail again) to be implemented. Alternatively, when executed by the processor 21, the computer program 23 causes each model/unit in the device for LCA correction as described above to perform its function, which will not described again to avoid repetition.

The computer equipment 20 comprises, but is not limited to, a processor 21 and a memory 22. Those skilled in the art can understand that FIG. 12 merely is an example of the computer equipment 20, but does not constitute a limitation to the computer equipment 20. The computer equipment 20 may include more or less components than those as shown, or a combination of certain components, or different components. For example, the computer deice may further include input and output devices, a network access device, a bus, etc.

The processor 21 may be a CPU or other general-purpose processor, Digital Signal Processor (DSP), Application Specific Integrated Circuits (ASIC), Field Programmable Gate Arrays (FPGA), or other programmable logic device, discrete gate or transistor logic device, discrete hardware components, etc. The general-purpose processor may be a microprocessor, or the processor may also be any conventional processor.

The memory 22 may be an internal storage unit of the computer equipment 20, such as a hard disk or a memory of the computer equipment 20. The memory 22 may also be an external storage device of the computer equipment 20, such as a plug-in hard disk equipped on the computer equipment 20, a Smart Storage Card (SMC), a Secure Digital (SD) card, or a Flash Card, etc. Further, the memory 22 may also include both an internal storage unit of the computer equipment 20 and an external storage device. The memory 22 is configured to store a computer program and other programs and data required by the computer equipment. The memory 22 may also be configured to temporarily store data that has been output or will be output.

Those skilled in the art can clearly understand that the specific operation process of the device and units as described above may correspond to the process in the methods as described above, which will not be repeated here.

In the several embodiments of the present invention, it should be understood that the disclosed device and method may be implemented in other manners. For example, the devices as described above are merely illustrative, and for example, the division of the units is only a division in the logical function, and there may be other division manners in actual implementations. For example, multiple units or components may be combined or it integrated into another system, or some features may be omitted or not implemented. In addition, the displayed or discussed mutual coupling or direct coupling or communication connection may be indirect coupling or communication connection via some interfaces, devices or units, and may be in electrical, mechanical or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions according to the present invention.

In addition, the functional units in the embodiments of the present invention may be integrated into one processing unit, or each unit may exist alone physically, or two or more units may be integrated into one unit. The above-mentioned integrated unit may be implemented in the form of a hardware functional unit, or may be implemented in the form of a functional unit based on a combination of hardware and software.

The above-mentioned integrated unit implemented in the form of a software functional unit may be stored in a computer readable storage medium. The above-mentioned software functional unit is stored in a storage medium and comprises several instructions to cause a computer equipment (which may be a personal computer, a server, or a network device, etc.) or a processor to execute part of the steps in the method as described in each embodiment of the present invention. The aforementioned storage media include: a U disk, a mobile hard disk, a Read-Only Memory (ROM), a Random Access Memory (RAM), a magnetic disk, an optical disk or any medium able to store program codes.

The above description are only the preferred embodiments of the present invention and are not intended to limit the present invention. Any modification, equivalent replacement, improvement, etc. made within the spirit and principle of the present invention shall fall within the scope of the present invention.

What is claimed is:

1. A method for correcting lateral chromatic aberration (LCA), comprising:
   capturing a target image from a test chart;
   calculating amount of LCA of a camera module based on the target image, comprising:
      upscaling the target image to obtain an upscaled target image;
      detecting pattern elements and calculating mass centers of the pattern elements based on the upscaled target image;
      compensating for shift of the mass centers by Bayer shift compensation;
      removing the pattern elements with wrong parameters by an outlier removal algorithm;

extrapolating the mass centers of the pattern elements at borders of the upscaled target image; and converting scattered data into 2D regularly sampled grid to obtaining the amount of LCA;

storing the amount of LCA as the calibration data;

acquiring system parameters and pre-stored calibration data;

obtaining the LCA of a camera to be corrected by calculating the system parameters; and correcting the LCA by the calibration data.

2. The method for correcting LCA as described in claim 1, wherein the storing the amount of LCA as the calibration data comprises storing the amount of LCA as the calibration data into a memory of the camera to be corrected.

3. The method for correcting LCA as described in claim 1, wherein the calibration data comprises data in the format of a grid, a parametric model, or a symmetric model.

4. A computer equipment, comprising a memory configured to store information including program instructions and a processor configured to control execution of the program instructions, wherein the program instructions, when loaded and executed by the processor, performing the steps in the method for correcting LCA as described in claim 1.

* * * * *